United States Patent
Liljegren et al.

(10) Patent No.: US 9,448,613 B1
(45) Date of Patent: Sep. 20, 2016

(54) ACTUATOR DETECTION

(71) Applicant: Amazon Technologies, Inc., Reno, NV (US)

(72) Inventors: Edward Albert Liljegren, San Francisco, CA (US); Hanh Thuy Phan, San Jose, CA (US); David Charles Buuck, Prunedale, CA (US); John Aaron Zarraga, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 224 days.

(21) Appl. No.: 13/891,016

(22) Filed: May 9, 2013

(51) Int. Cl.
*G06F 1/32* (2006.01)
*G08B 6/00* (2006.01)

(52) U.S. Cl.
CPC .............. *G06F 1/3287* (2013.01); *G08B 6/00* (2013.01)

(58) Field of Classification Search
CPC ............. G05B 2219/40553; G06F 3/016; G06F 3/04886; G06F 11/3041; G06F 1/3287; B60W 50/16; F15B 13/14; H01H 13/85
See application file for complete search history.

(56) References Cited

U.S. PATENT DOCUMENTS

| | | | | |
|---|---|---|---|---|
| 4,987,372 | A * | 1/1991 | Ofori-Tenkorang et al. | 324/705 |
| 6,037,930 | A * | 3/2000 | Wolfe et al. | 345/174 |
| 6,618,811 | B1 * | 9/2003 | Berthaud | G06F 1/26 713/300 |
| 2004/0225814 | A1* | 11/2004 | Ervin | 710/305 |
| 2008/0197716 | A1* | 8/2008 | Rubio | G06F 1/263 307/128 |
| 2008/0201511 | A1* | 8/2008 | Deshpande | G06F 13/4291 710/110 |
| 2009/0134927 | A1* | 5/2009 | Thomas et al. | 327/306 |
| 2011/0095877 | A1* | 4/2011 | Casparian et al. | 340/407.2 |
| 2011/0102326 | A1* | 5/2011 | Casparian et al. | 345/168 |
| 2011/0234000 | A1* | 9/2011 | Yan | H02M 3/157 307/31 |
| 2011/0260990 | A1* | 10/2011 | Ali et al. | 345/173 |
| 2012/0004034 | A1* | 1/2012 | Pope et al. | 463/36 |
| 2012/0137142 | A1* | 5/2012 | Feng | G06F 1/26 713/300 |
| 2012/0229264 | A1* | 9/2012 | Company Bosch et al. | 340/407.1 |
| 2013/0162298 | A1* | 6/2013 | Zhou | G06F 13/10 327/77 |

\* cited by examiner

*Primary Examiner* — Kent Chang
*Assistant Examiner* — William Lu
(74) *Attorney, Agent, or Firm* — Lowenstein Sandler LLP (57) ABSTRACT

A voltage control circuit in an electronic device receives an actuator identification signal from a personality module of an actuator in the electronic device. The voltage control circuit determines, based on the actuator identification signal, an operating voltage for the actuator and providing a drive signal at the operating voltage to the actuator.

21 Claims, 6 Drawing Sheets

ACTUATOR DETECTION

BACKGROUND

A large and growing population of users enjoy entertainment through the consumption of digital media items, such as music, movies, images, electronic books, and so on. Users employ various electronic devices to consume such media items. Among these electronic devices are electronic book readers, cellular telephones, personal digital assistants (PDAs), portable media players, tablet computers, netbooks, and the like.

These electronic devices often include actuators to provide motion in the device, such as tactile feedback, vibration, or some other form of haptic response. Actuators are operated by a source of energy, such as an electric current, and convert that energy into some kind of motion. For example, a controller may provide a signal indicating a vibration, and in response the actuator will vibrate to provide a sensation of movement to the user of the device. Due to differences in manufacturing, materials and design, different actuators may operate at different voltage levels or use different signal waveforms to create the motion. As such, it is important to know the operating characteristics of any individual actuator that is in use in an electronic device. In conventional systems, there may be no way to determine these operating characteristics of an actuator without a time consuming and expensive testing process.

BRIEF DESCRIPTION OF THE DRAWINGS

Embodiments of the present disclosure will be understood more fully from the detailed description given below and from the accompanying drawings, which, however, should not be taken to limit the present disclosure to the specific embodiments, but are for explanation and understanding only.

DETAILED DESCRIPTION

Embodiments of an apparatus are described for an actuator detection system in an electronic device. Actuators are often used to provide motion in a device, such as tactile feedback, vibration, or some other form of haptic response. Actuators may be operated by a source of energy, such as an electric current, and convert that energy into some kind of motion. In one embodiment, a haptic controller provides a signal with a specific waveform and at a particular operating voltage to the actuator and, in response, the actuator will vibrate to provide a sensation of movement to the user of the device. Due to differences in manufacturing, materials and design, different actuators may operate at different voltage levels or use different signal waveforms to create the motion. Thus, in one embodiment, the electronic device further includes a voltage control circuit to determine the proper operating voltage and waveforms for the actuator. The voltage control circuit may receive an actuator identification signal from a personality module on the actuator that uniquely identifies the actuator or actuator type. Based on the actuator identification signal, the voltage control circuit can determine an operating voltage for the actuator and cause the haptic controller to provide a drive signal at the operating voltage to the actuator.

In one embodiment, the voltage control circuit includes a feedback resistor network and a switch that is controlled by the actuator identification signal received from the personality module. The switch can change the effective resistance of the feedback resistor network in response to the actuator identification signal by adding or removing one or more additional resistors to the feedback resistor network. In one embodiment, the resistors in the feedback resistor network are arranged as a voltage divider which receives a boost voltage from the haptic controller as an input and outputs a feedback voltage which may be used as the operating voltage in the drive signal which the haptic controller provides to the actuator. In another embodiment, the electronic device includes an application processor which can controller the feedback resistor network based on the actuator identification signal or perform a lookup operation on a data structure in memory to determine the operating voltage for the actuator.

In this manner, the actuator detection system can automatically detect the specific actuator or the type of actuator being used in the electronic device and determine the proper operating voltage and waveforms to use with the actuator. This prevents device manufacturers from needing separate board configurations for different actuators that may be used. It also allows an actuator to be replaced in the electronic device with a different type of actuator (e.g., in the case of upgrade or repair) without having to reconfigure the board on which the actuator is installed or the software which controls operation of the actuator. These advantages can result in a significant savings in time and resources as compared to conventional techniques.

Figure 1:
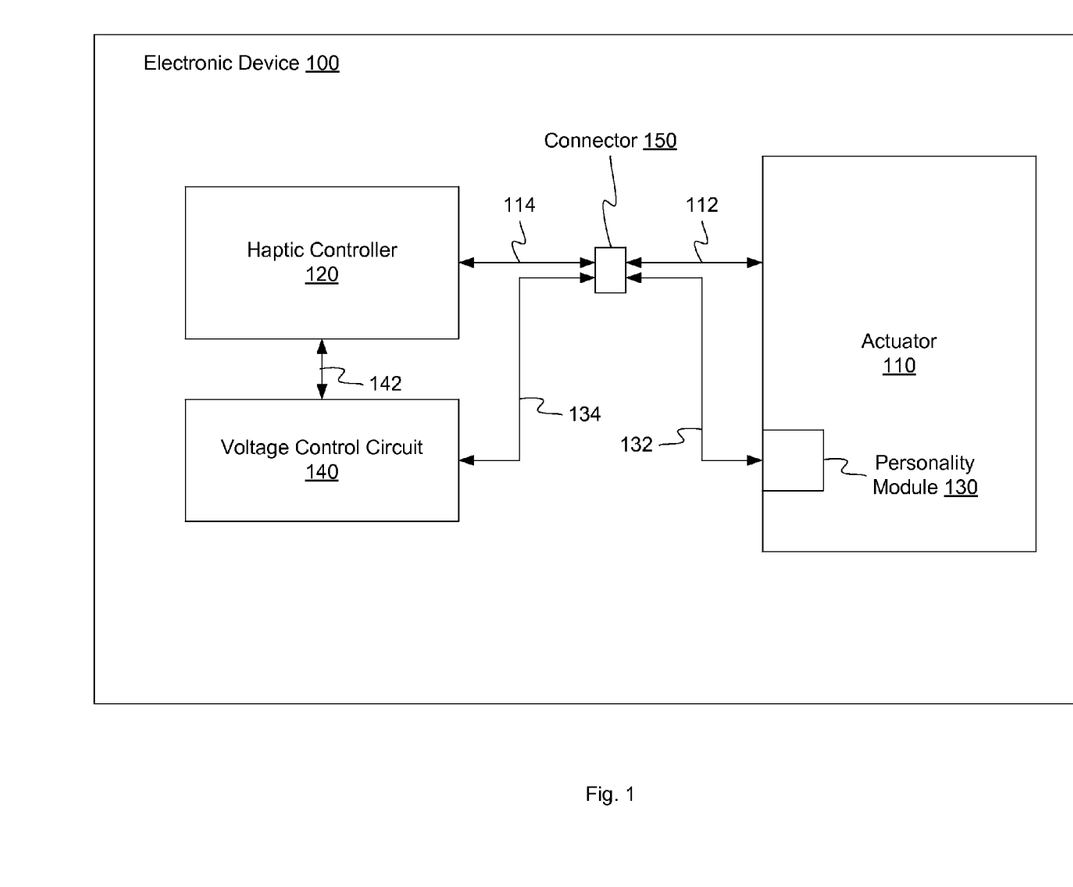
FIG. 1 is a block diagram illustrating an electronic device with an actuator detection system, according to an embodiment.

FIG. 1 is a block diagram illustrating an electronic device with an actuator detection system, according to an embodiment. In one embodiment electronic device 100 includes actuator 110, haptic controller 120 and voltage control circuit 140. Actuator 110, haptic controller 120 and voltage control circuit 140 may be attached to a support structure (not shown) within electronic device 100, such as a printed circuit board (PCB) or other substrate. Electronic device 100 may additionally include connector 150, which may be used to form an electrical connection between actuator 110 and the other components in electronic device 100 (e.g., haptic controller 120 and voltage control circuit 140). For example, signal lines 112 and 132, which may be wires, buses, traces, etc., may transmit electrical signals between actuator 110 and connector 150, while signal lines 114 and 134 transmit electrical signals between connector 150 and haptic controller 120 and voltage control circuit 140, respectively. Electronic device 100 may include, for example, an electronic book reader, a cellular telephone, a personal digital assistant (PDA), a portable media player, a tablet computer, a netbook, or any portable, compact electronic device.

In one embodiment, actuator 110 is used to provide motion in electronic device, such as tactile feedback, vibration, or some other form of haptic response. Actuator 110 may be operated by a source of energy, such as an electric current in a drive signal received from haptic controller 120, and may convert that energy into some kind of motion. In one embodiment, haptic controller 114 provides a signal to actuator 110 over signal lines 112 and 114 with a specific waveform and at a particular operating voltage. In response to the received drive signal, actuator 110 will vibrate to provide a sensation of movement to the user of electronic device 100.

In one embodiment, actuator 110 may be an electromagnetic vibratory motor that vibrates in response to an applied magnetic field. In another embodiment, actuator 110 may be a piezoelectric crystal actuator, where the width of the crystals can be changed by the application of electric fields. In other embodiments, some other type of actuator 110 may be used. In still other embodiments, the detection and control techniques described herein may be used with some other component besides actuator 110. For example, the system could control some other type of transducer, such as a speaker, microphone, display, etc. For ease of explanation, however, the embodiments herein will be described with respect to actuator 110.

Due to differences in manufacturing, materials and design, different actuators may operate at different voltage levels or use different signal waveforms to create the motion. Thus, in one embodiment, electronic device 100 further includes voltage control circuit 140 to determine the proper operating voltage and waveforms for actuator 110. In one embodiment, voltage control circuit 140 receives an actuator identification signal, over signal lines 132 and 134, from personality module 130 in actuator 110. The actuator identification signal may uniquely identify actuator 110 or the actuator type. Based on the actuator identification signal, voltage control circuit 140 can determine an operating voltage for actuator 110 and cause haptic controller 120 to provide a drive signal at the operating voltage to actuator 110.

In one embodiment, personality module 130 is a circuit or software component designed to generate and provide the actuator identification signal. Depending on the implementation, the complexity of personality module 130 can vary significantly. For example, in one embodiment, personality module 130 may include a pin or line that is either left floating or tied to ground. In this embodiment, voltage control circuit 140 may include a pull-up resistor to pull the value of signal line 132 high (e.g., to a haptic pull-up voltage or a power supply voltage) when the pin in personality module 130 is left floating. Thus, the signal line 132 may be high when actuator 110 is a first type of actuator and signal line 132 may be low (i.e., tied to ground or some other low voltage source) when actuator 110 is a second type of actuator. In another embodiment, personality module 130 may include a multi-pin connector with a resistor having a particular value connected between the pins. The resistance value of the resistor may identify the type of actuator, so that voltage control circuit 140 can measure the voltage drop across the resistor to identify actuator 110. In yet another embodiment, personality module 130 may include a serial interface and the actuator identification signal may include a specific identification of the actuator, such as a name, value or other identifier, and may optionally include a particular operating voltage level or waveform with which to drive actuator 110.

In one embodiment, voltage control circuit 140 includes a feedback resistor network and a switch that is controlled by the actuator identification signal received from personality module 130. The switch can change the effective resistance of the feedback resistor network in response to the actuator identification signal by adding or removing one or more additional resistors to the feedback resistor network. In one embodiment, the resistors in the feedback resistor network are arranged as a voltage divider which receives a boost voltage from haptic controller 120 as an input and outputs a feedback voltage which may be used as the operating voltage in the drive signal which haptic controller 120 provides to actuator 110 (e.g., over signal lines 112 and 114).

In another embodiment, voltage control circuit 140 may include a processing device configured to perform a look-up operation on a data structure stored in a memory to identify the operating voltage for the determined type of actuator. For example, if the actuator identification signal provided by personality module 130 identifies a type of actuator (e.g., by a high or low voltage signal, by a resistor value), the processing device may consult a data structure storing the identifier for the actuator 110 and a corresponding operating voltage (and optionally a drive signal waveform). The processing device in voltage control circuit 140 then sends a message to haptic controller 120 (e.g., over signal line 142) instructing haptic controller 120 to provide a drive signal at the corresponding operating voltage to actuator 110. Additional details of voltage control circuit 140 are provided below.

Figure 2:
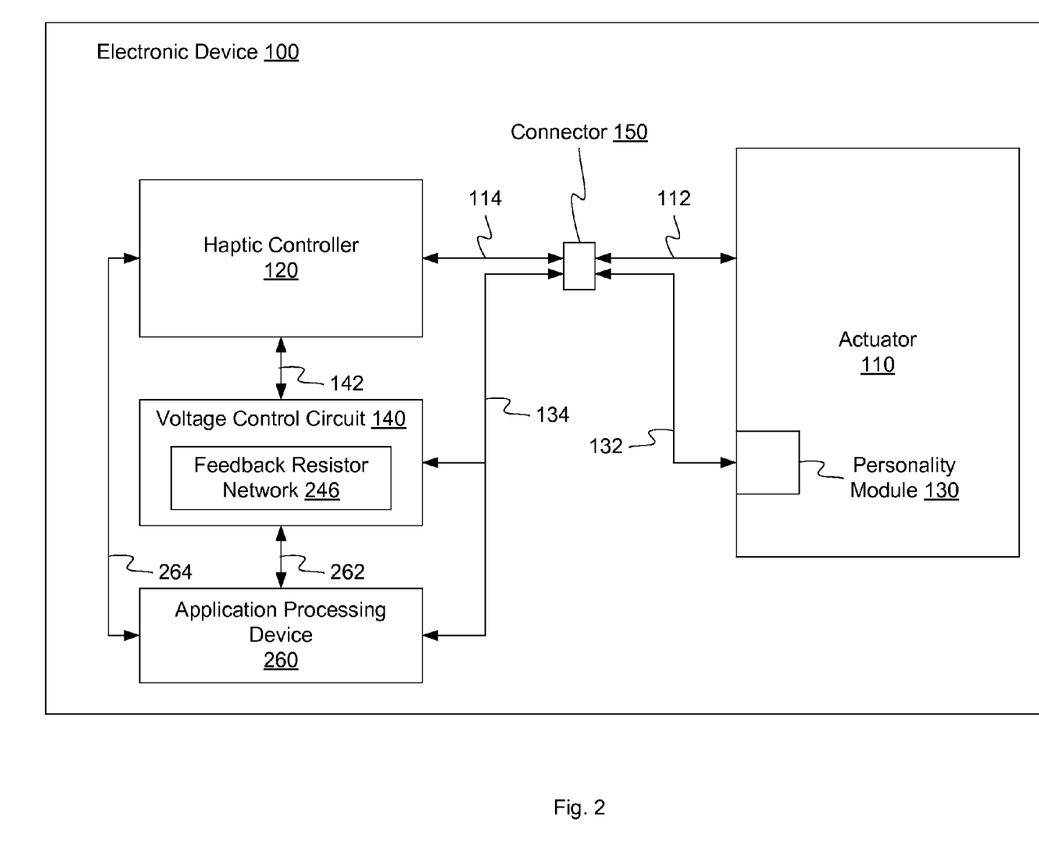
FIG. 2 is a block diagram illustrating an electronic device with an actuator detection system including an application processing device, according to an embodiment.

FIG. 2 is a block diagram illustrating an electronic device with an actuator detection system including an application processing device, according to an embodiment. In one embodiment, in addition to the components described above, electronic device also includes application processing device 260. Application processing device 260 may include, for example, a central processing units (CPU), microcontroller, field programmable gate array, or other type of processing device. Application processing device may be designed to initiate haptic feedback events in electronic device 100 on behalf of other applications running on electronic device 100. For example, application processing device 260 may execute a gaming application, which at certain times, includes a haptic response (e.g., a vibration). In such instances, application processing device 260 sends an instruction to haptic controller 120 (e.g., over signal line 264) to initiate a haptic feedback event in actuator 110.

In one embodiment, application processing device 260 can also perform the look-up operation described above to determine the operating voltage and signal waveform for actuator 110. In one embodiment, application processing device 260 receives the actuator identification signal from personality module 130 over signal lines 132 and 134. Application processing device 260 can consult a data structure in a memory, such as memory 606 of FIG. 6, and determine an operating voltage corresponding to the identifier of actuator 110 received in the actuator identification signal. Application processing device 260 may send an instruction to haptic controller 120 (e.g., over signal line 264) to provide a drive signal at the corresponding operating voltage to actuator 110.

In another embodiment, application processing device 260 can control the effective resistance of a feedback resistor network 246 in voltage control circuit 140. For example, as described above, application processing device 260 can receive an identifier of actuator 110 from personality module 130. In response, application processing device 260 can configure feedback resistor network 246 to generate an appropriate operating voltage for actuator 110 from a boost voltage provided by haptic controller 120. In one embodiment, application processing device 260 may send a signal or signals over signal line 262 to feedback resistor network 246. The signal may activate or deactivate one or more switches in feedback resistor network 246. The switches may control whether certain resistors contribute to the effective resistance of the feedback resistor network 246. In one embodiment, the feedback resistor network 246 may receive the boost voltage from haptic controller 120 over signal line 142 as an input, may reduce the boost voltage to a feedback voltage as a function of the effective resistance, and may provide the feedback voltage back to haptic controller 120 to be used as the operating voltage for actuator 110. Haptic controller 120 may drive actuator 110 with the operating voltage over signal lines 112 and 114.

Figure 3A:
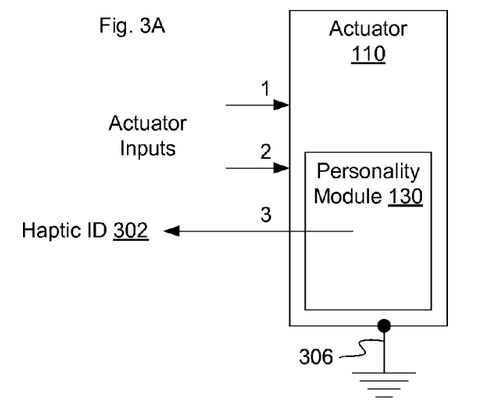
FIG. 3A is a block diagram illustrating a personality module for an actuator in an actuator detection system, according to an embodiment.
Figure 3B:
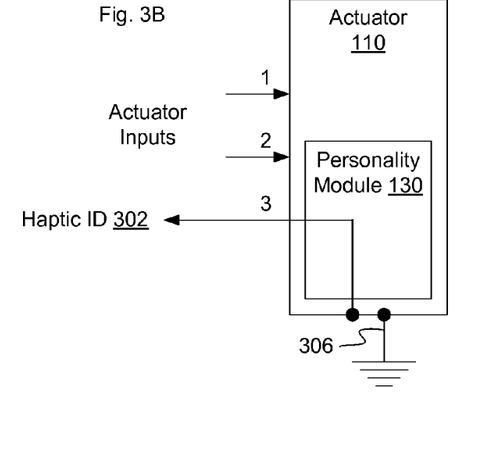
FIG. 3B is a block diagram illustrating a personality module for an actuator in an actuator detection system, according to an embodiment.
Figure 3C:
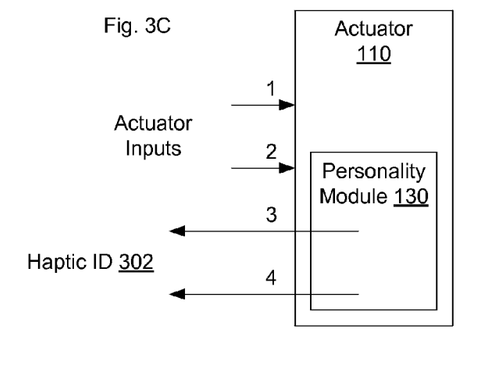
FIG. 3C is a block diagram illustrating a personality module for an actuator in an actuator detection system, according to an embodiment.
Figure 3D:
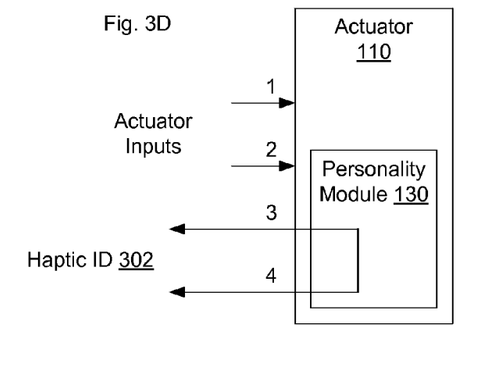
FIG. 3D is a block diagram illustrating a personality module for an actuator in an actuator detection system, according to an embodiment.

FIGS. 3A-3D are block diagrams illustrating personality modules for an actuator in an actuator detection system, according to an embodiment. FIGS. 3A and 3B illustrate embodiments where actuator 110 includes a 3-pin connector. FIGS. 3C and 3D illustrate embodiments where actuator 110 includes a 4-pin connector. In each illustrated embodiment, pins 1 and 2 of actuator 110 are used as actuator inputs. These pins may receive signals that are not necessarily related to actuator detection from other components in electronic device 100. In each illustrated embodiment, pin 3 is used to transmit the Haptic ID signal 302. Haptic Id signal 302 may be used as the actuator identification signal described above which uniquely identifies the actuator 110 of which personality module 130 is a part. In the embodiments illustrated in FIGS. 3C and 3D, where actuator 110 includes a fourth pin, pin 4 is generally grounded or connected to some other low voltage source.

FIG. 3A illustrates an embodiment where actuator 110 has a 3-pin connector and pin 3 is left floating. This configuration may be used to identify a first type of actuator. Since pin 3 is left floating (i.e., not driven with any voltage or connected to ground 306), the Haptic ID signal 302 may be pulled high by a pull-up resistor in voltage control circuit 140. FIG. 3B illustrates an embodiment where actuator 110 has a 3-pin connector and pin 3 is tied to ground 306. In one embodiment, pin 3 may be connected to a system ground, a board ground, or to a grounded shield can that surrounds actuator 110. Since pin 3 is tied to ground (or some other low voltage source), the Haptic ID signal 302 may be at a low voltage level (e.g., 0 volts). This configuration may be used to identify a second type of actuator that is different that the first actuator. The second type of actuator may be different in that it has different operational characteristics, such as a different operating voltage.

FIG. 3C illustrates an embodiment where actuator 110 has a 4-pin connector and pins 3 and 4 are left open (i.e., floating). In this embodiment, both pins 3 and 4 may be used to transmit Haptic ID signal 302. This configuration may be used to identify the first type of actuator. Since pins 3 and 4 are left open (i.e., not driven with any voltage), the Haptic ID signal 302 may be pulled high by a pull-up resistor in voltage control circuit 140. FIG. 3D illustrates an embodiment where actuator 110 has a 4-pin connector and pin 3 is tied to pin 4 (which may in turn be tied to ground). Since pins 3 and 4 are shorted together and tied to ground, the Haptic ID signal 302 may be at a low voltage level (e.g., 0 volts). This configuration may be used to identify the second type of actuator. In other embodiments, some other configuration or circuit may be used for personality module 130.

Figure 4:
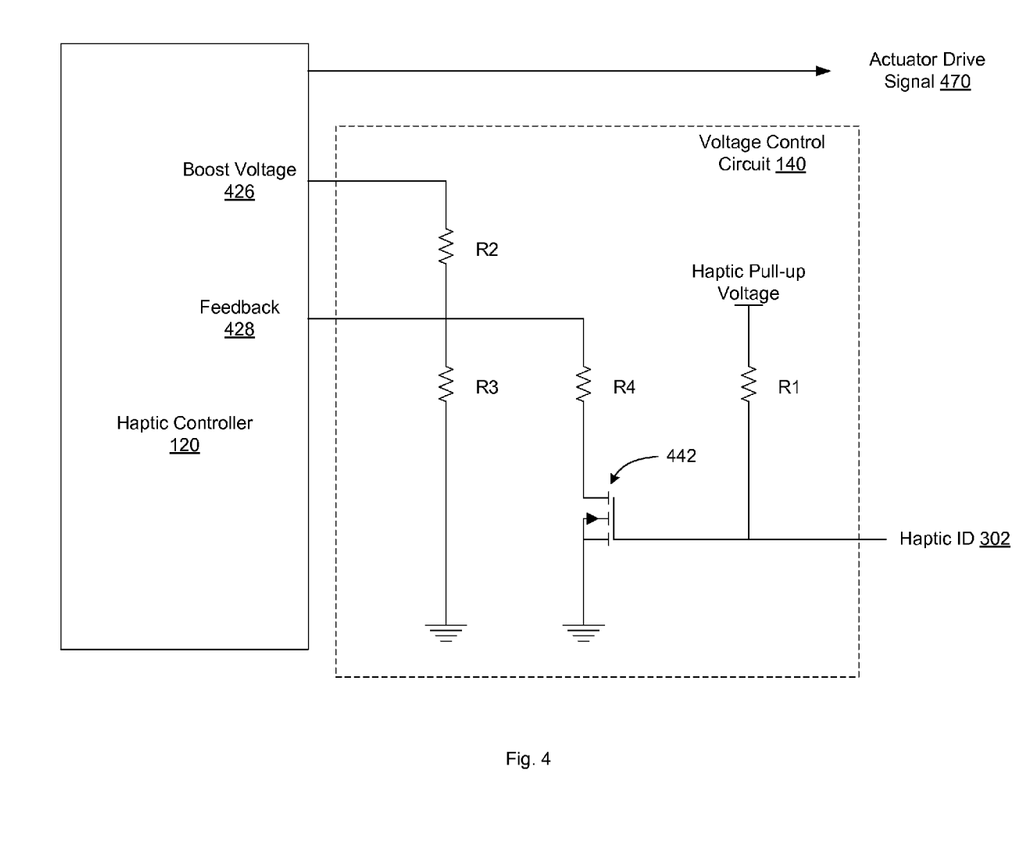
FIG. 4 is a block diagram illustrating a voltage control circuit in an actuator detection system, according to an embodiment.

FIG. 4 is a block diagram illustrating a voltage control circuit in an actuator detection system, according to an embodiment. In one embodiment, the voltage control circuit 140 includes a pull-up resistor R1 and switch 442 and a feedback resistor network including resistors R2, R3 and R4. In one embodiment, voltage control circuit 140 receives the Haptic ID signal 302, which may be one example of the actuator identification signal, from personality module 130 on actuator 110. As described above, in one embodiment, the Haptic ID signal 302 may either be floating to identify a first actuator type or tied to ground to identify a second actuator type. The pull-up resistor R1 may be connected between the input signal line where the Haptic ID signal 302 is received and some high voltage source such as a haptic pull-up voltage or Vdd. When the input signal line is floating, the pull-up resistor R1 may pull the voltage level of the Haptic ID signal 302 up to the haptic pull-up voltage or Vdd. When the input signal line is tied to ground, the pull-up resistor R1 may not affect the Haptic ID signal 302 which may remain at a low voltage level.

The Haptic ID signal 302 may control the operation of switch 442. In one embodiment, switch 442 may be a metal oxide semiconductor field effect transistor (MOSFET), and the Haptic ID signal 302 may be connected to a drain terminal. In this manner, the Haptic ID signal 302 may serve to activate switch 442 (e.g., allow current to flow between the source and drain terminals) when the Haptic ID signal 302 is high and deactivate switch 442 when the Haptic ID signal 302 is low.

In one embodiment, the resistors R2 and R3 in the feedback resistor network are arranged as a voltage divider. The voltage divider may receive boost voltage 426 as an input from haptic controller 120, or from some other source, and may provide a feedback signal 428 as an output. In one embodiment, the feedback signal 428 is provided to haptic controller 120. The feedback resistor network may also include one or more additional resistors, such as R4. In one embodiment the resistor R4 is connected in parallel with the resistor R3 (e.g., between the feedback voltage 428 and ground). In one embodiment, when switch 442 is deactivated, the fixed values of resistors R2 and R3 provide a known value for feedback voltage 428, which is some portion of the boost voltage 426 depending on the values of resistors R2 and R3. In this embodiment, the feedback voltage 428 may be equal to the boost voltage 426 times the resistance of R3 divided by the sum of the resistances of R2 and R3. This value of the feedback voltage 428 may be calibrated to be the proper operating voltage for actuator 110 when the Haptic ID signal 302 is low. When the Haptic ID signal 302 activates switch 442, however, the resistance of resistor R4 changes the effective resistance of the resistor divider, thereby changing the value of the feedback voltage 428. The effective resistance of the feedback resistor network is total resistance experienced by a signal applied to the input and measured out the output. In one embodiment, this may be determined as the sum of the resistances that are connected in series and the reciprocal of the sum of the reciprocals of the individual resistances that are connected in parallel. In one embodiment, the values of the resistors R2, R3 and R4 can be set so that the resulting feedback voltage 428 when switch 442 is activated is the proper operating voltage for actuator 110 when the Haptic ID signal 302 is high.

In one embodiment, haptic controller 120 may receive the feedback voltage 428 from voltage control circuit 140 and provide an actuator drive signal 470 having the same voltage as feedback voltage 428. In another embodiment, actuator drive signal 470 may be some proportion of the feedback voltage 428. In another embodiment, a particular feedback voltage 428 may cause haptic controller 120 to provide actuator drive signal 470 with some other unrelated voltage to actuator 110.

Figure 5:
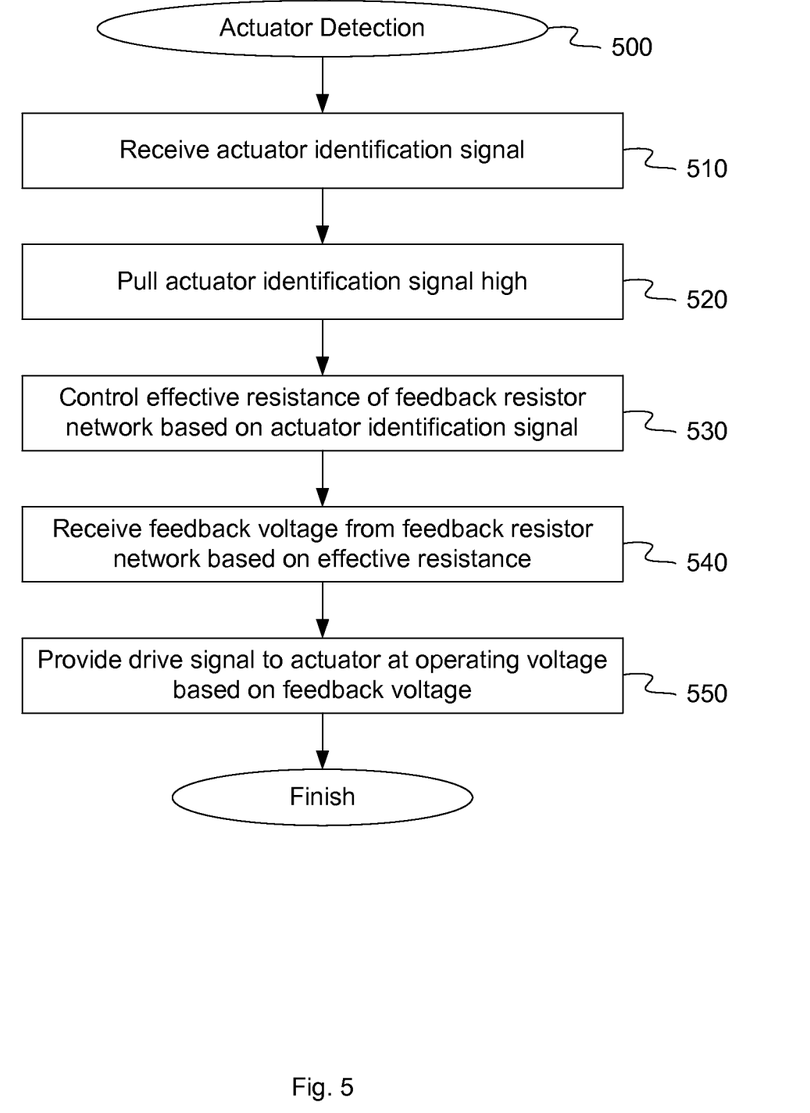
FIG. 5 is a flow diagram illustrating an actuator detection method, according to an embodiment.

FIG. 5 is a flow diagram illustrating an actuator detection method, according to an embodiment. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured detect a type of actuator used in an electronic device and determine an operating voltage to be supplied to the actuator. In one embodiment, method 500 may be performed haptic controller 120 and voltage control circuit 140, as shown in FIGS. 1, 2 and 4.

Referring to FIG. 5, at block 510, method 500 receives an actuator identification signal. In one embodiment, voltage control circuit 140 receives the actuator identification signal from personality module 130 in actuator 110. Voltage control circuit 140 may receive the actuator identification signal over signal lines 132 and 134 and through connector 150. For example, the actuator identification signal may include the Haptic ID signal 302. The actuator identification signal may uniquely identify actuator 110 or may identify the type of actuator.

At block 520, method 500 attempts to pull the actuator identification signal high to a haptic pull-up voltage or to a power supply voltage. If the signal line is floating (to identify a particular actuator or actuator type), the voltage on the line will be pulled up by pull-up resistor R1. Pull-up resistor R1 may be connected between the input signal line where the Haptic ID signal 302 is received and some high voltage source such as a haptic pull-up voltage or Vdd. When the input signal line is floating, the pull-up resistor R1 may pull the voltage level of the Haptic ID signal 302 up to the haptic pull-up voltage or Vdd. When the input signal line is tied to ground (to identify a different actuator or actuator type), the pull-up resistor R1 may not affect the Haptic ID signal 302, which may remain at a low voltage level.

At block 530, method 500 controls an effective resistance of the feedback resistor network based on the actuator identification signal. In one embodiment, the Haptic ID signal 302 controls the operation of switch 442. The feedback resistor network includes the resistors R2 and R3 in the feedback resistor network arranged as a voltage divider. The feedback resistor network may also include one or more additional resistors, such as R4. In one embodiment, when switch 442 is deactivated by a low Haptic ID signal 302, the fixed values of resistors R2 and R3 provide a known value for a feedback voltage 428. When the Haptic ID signal 302 activates switch 442, the resistance of resistor R4 changes the effective resistance of the resistor divider, thereby changing the value of the feedback voltage 428.

At block 540, method 500 receives a feedback voltage from the feedback resistor network based on the effective resistance. In one embodiment, the voltage divider in voltage control circuit 140 may receive boost voltage 426 as an input from haptic controller 120, or from some other source, and may provide a feedback signal 428 as an output. In one embodiment, the feedback signal 428 is provided to haptic controller 120. The feedback signal 428 may be some proportion of the boost voltage 426 that varies according to the effective resistance of the feedback resistor network.

At block 550, method 500 provides a drive signal to the actuator at an operating voltage based on the feedback voltage. In one embodiment, haptic controller 120 may receive the feedback voltage 428 from voltage control circuit 140 and provide an actuator drive signal 470 having the same voltage as feedback voltage 428. In another embodiment, actuator drive signal 470 may be some proportion of the feedback voltage 428. In yet another embodiment, a particular feedback voltage 428 may cause haptic controller 120 to provide actuator drive signal 470 with some other unrelated voltage to actuator 110.

Figure 6:
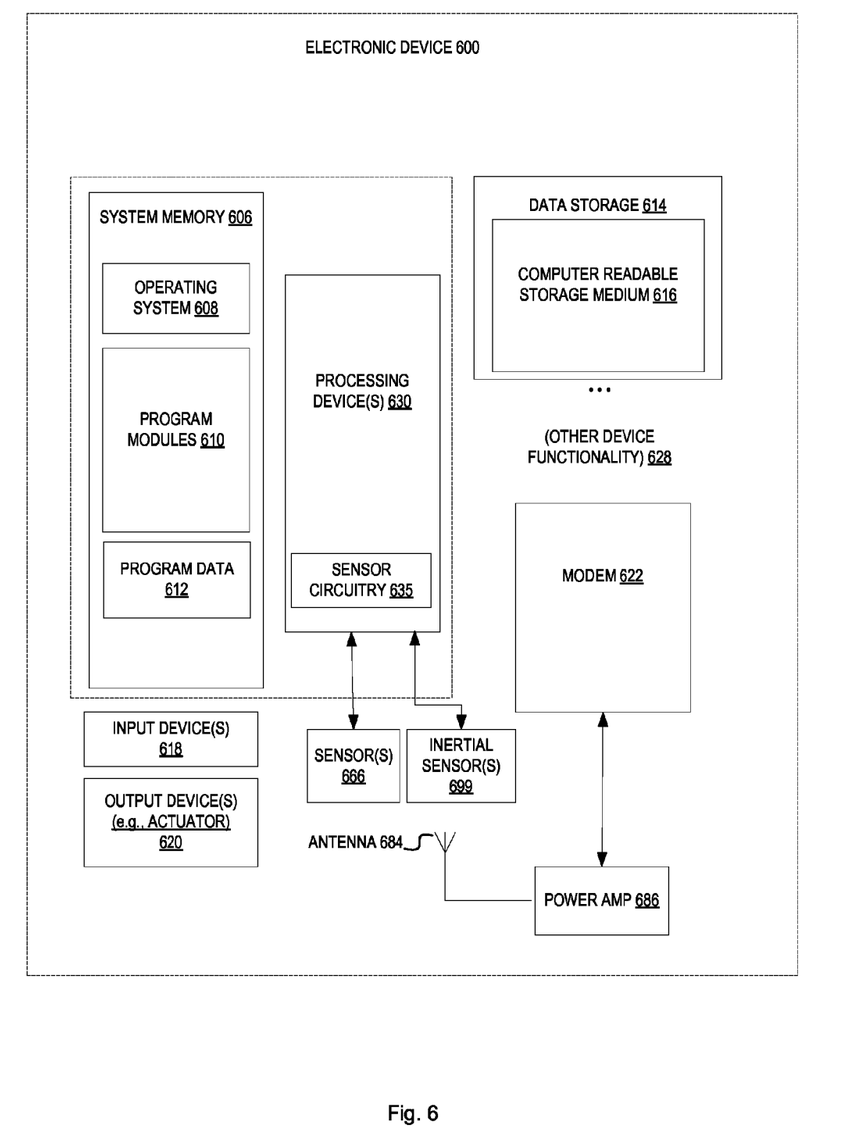
FIG. 6 is a block diagram illustrating an exemplary user device, according to an embodiment.

FIG. 6 illustrates a functional block diagram of an embodiment of an electronic device. The electronic device 600 may correspond to the electronic device 100 as shown in FIGS. 1-4 and may be any type of computing device such as an electronic book reader, a PDA, a mobile phone, a laptop computer, a portable media player, a tablet computer, a smart phone, a camera, a video camera, a netbook, a desktop computer, a gaming console, a digital video disc (DVD) player, a computing pad, a media center, and the like.

The electronic device 600 includes one or more processing devices 630, such as one or more central processing units (CPUs), microcontrollers, field programmable gate arrays, or other types of processing devices. For example, processing device 630 may be one example of application processing device 260. The electronic device 600 also includes system memory 606, which may correspond to any combination of volatile and/or non-volatile storage mechanisms. The system memory 606 may include one or more of read-only memory (ROM), flash memory, dynamic random access memory (DRAM) such as synchronous DRAM (SDRAM)), and static random access memory (SRAM)). The system memory 606 stores information which provides an operating system component 608, various program modules 610, program data 612, and/or other components. The electronic device 600 performs functions by using the processing device(s) 630 to execute instructions provided by the system memory 606.

The electronic device 600 also includes a data storage device 614 that may be composed of one or more types of removable storage and/or one or more types of non-removable storage. The data storage device 614 includes a computer-readable storage medium 616 on which is stored one or more sets of instructions embodying any one or more of the methodologies or functions described herein. The electronic device 600 may also include one or more input devices 618 (keyboard, mouse device, specialized selection keys, etc.) and one or more output devices 620 (displays, printers, audio output mechanisms, haptic feedback mechanisms such as actuator 110, etc.). In one embodiment, the input devices 618 and the output devices 620 may be combined into a single device (e.g., a touch screen).

The electronic device 600 further includes a wireless modem 622 to allow the electronic device 600 to wirelessly communicate with other computing devices. The wireless modem 622 allows the electronic device 600 to handle both voice and non-voice communications (such as communications for text messages, multimedia messages, media downloads, web browsing, etc.). The wireless modem 622 may also allow the electronic device 600 to handle other signaling data to facilitate communication of the voice and non-voice data between the electronic device 600 and other devices. The wireless modem 622 may provide network connectivity using any type of mobile network technology including, for example, cellular digital packet data (CDPD), general packet radio service (GPRS), enhanced data rates for global evolution (EDGE), universal mobile telecommunications system (UMTS), 1 times radio transmission technology (1×RTT), evaluation data optimized (EVDO), high-speed down-link packet access (HSDPA), WiFi, HSPA+, WiMAX, Long Term Evolution (LTE) and LTE Advanced (sometimes generally referred to as 4G), etc. It should be noted that the modem 622 may include a processing component that performs various operations to handle both voice and non-voice communications.

The wireless modem 622 may generate signals and send these signals to power amplifier (amp) 680 for amplification, after which they are wirelessly transmitted via antenna 684. The antenna 684 may be directional, omni-directional or non-directional antennas. In addition to sending data, the antenna 684 can be deployed to receive data, which is sent to wireless modem 622 and transferred to processing device (s) 630. In one embodiment, the antenna 684 may be used to form communication links between the electronic device 600 and a base station (e.g., a NodeB or a cell tower).

The processing device(s) 630 and the modem 622 may be a general-purpose processing devices such as a microprocessor, central processing unit, or the like. More particularly, the processing device(s) 630 and the modem 622 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device(s) 630 and the modem 622 may also be one or more special-purpose processing devices such as an application specific integrated circuit (ASIC), a field programmable gate array (FPGA), a digital signal processor (DSP), network processor, or the like.

In one embodiment, electronic device 600 includes one or more sensors 666 such as a physical contact sensor or close proximity sensors. The sensors 666 can detect the human body parts proximate to the electronic device, and convey information regarding the detection to processing device(s) 630. In one embodiment, the sensors 666 may be capacitive sensors that are configured to measure capacitance generated by the human body part proximate to the electronic device using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 666 may also be optical (e.g., infrared) sensors that use an emitter and receiver pair to detect the presence of opaque objects. Alternatively, the sensors 666 may be inductive sensors, which include an inductive loop. When the presence of a human body part (or metal object) is brought close to the inductive sensor, an induction of the inductive loop changes, causing the human body part to be detected. Alternatively, the sensors 666 may be ultrasonic sensors that emit an ultrasonic signal and measure a time duration between when a signal is transmitted and the reflection of that signal received (a.k.a., flight response). The sensors 666 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. It should also be noted that the sensors 666 may be used to determine a distance between one or more of the antennas and the detected human body part. Though the detected object is described herein as a human body part, other types of objects may also be detected depending on the sensing technologies used.

In one embodiment, electronic device 600 includes one or more inertial sensors 699. The inertial sensors 699 can be used to detect motion of the electronic device 600. In one embodiment, the inertial sensors 699 detect linear accelerations (translational movement) and angular accelerations (rotational movement). The inertial sensors 699 may include accelerometers and/or gyroscopes. Gyroscopes use principals of angular momentum to detect changes in orientation (e.g., changes in pitch, roll and twist). Accelerometers measure accelerations along one or more axes (e.g., translational changes). The gyroscope and accelerometer may be separate sensors, or may be combined into a single sensor. The inertial sensors 699 in one embodiment are microelectromechanical systems (MEMS) sensors.

In one embodiment, the motion data from the one or more inertial sensors 699 may be used to determine an orientation of the electronic device 600 to determine if a communication link criterion is satisfied (e.g., whether the electronic device 600 is in proximity to a user's body). In another embodiment, the sensor data from the one or more sensors 666 may be used to determine an orientation of the electronic device 600 for to determine if a communication link criterion is satisfied. In a further embodiment, of the motion data and the sensor data may be used to determine whether a communication link criterion is satisfied.

The processing device(s) 630 may include sensor circuitry 635 (e.g., sensor device drivers) that enables the processing device(s) 630 to interpret signals received from the sensor(s) 666 and/or inertial sensors 699. In one embodiment, the sensors 666 and/or inertial sensors 699 output fully processed signals to the processing device(s) 630. For example, the sensors 666 may output a distance, a detected/not detected signal, etc. using a single line interface or a multi-line interface. Similarly, inertial sensors 699 may output an acceleration value (e.g., in Gs). In another embodiment, the sensors 666 output, for example, positional data and/or object presence data (e.g., of a human body part) to the processing devices) 630 without first processing the data. Similarly, inertial sensors 699 may output, for example, voltage values that can be interpreted as acceleration values. In either instance, the processing device(s) 630 may use the sensor circuitry 635 to process and/or interpret the received data. If data is received from multiple sensors 666 and/or inertial sensors 699, processing the data may include averaging the data, identifying a maximum from the data, or otherwise combining the data from the multiple sensors. In one embodiment, in which the sensors 666 include a sensor array, numerous sensors, or a touch panel, processing the data includes determining where on the electronic device the human body part is located from multiple sensor readings.

The foregoing description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of embodiments of the present disclosure.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

It is to be understood that the above description is intended to be illustrative, and not restrictive. Many other embodiments will be apparent to those of skill in the art upon reading and understanding the above description. The scope of the present disclosure should, therefore, be determined with reference to the appended claims, along with the full scope of equivalents to which such claims are entitled.

What is claimed is:

1. An electronic device comprising:
   an actuator to generate an actuator identification signal to identify the actuator as a first actuator type and to indicate an operational characteristic of the actuator;
   a voltage control circuit coupled to the actuator, wherein the voltage control circuit comprises:
      a feedback resistor network; and
      a switch coupled to the feedback resistor network, the switch to change an effective resistance of the feedback resistor network based on the actuator identified by the actuator identification signal, wherein a first effective resistance corresponds to the first actuator type and a second effective resistance corresponds to a second actuator type; and
   a haptic controller coupled to the actuator and the voltage control circuit, the haptic controller configured to provide a boost voltage to the feedback resistor network of the voltage control circuit, wherein the first effective resistance of the feedback resistor network adjusts the boost voltage to generate an actuator drive signal at a voltage that satisfies the operational characteristic of the actuator, and wherein the haptic controller is configured to provide the actuator drive signal to the actuator.

2. The electronic device of claim 1, wherein the actuator comprises a multi-pin connector, wherein a first pin and a second pin of the multi-pin connector comprise actuator outputs and a third pin of the multi-pin connector provides the actuator identification signal, and wherein the third pin is floating when the actuator comprises the first actuator type and is coupled to a ground node when the actuator comprises the second actuator type.

3. The electronic device of claim 2, wherein the voltage control circuit further comprises a pull-up resistor to pull a value of the actuator identification signal to a haptic pull-up voltage when the third pin of the multi-pin connector is floating.

4. The electronic device of claim 1, wherein the feedback resistor network comprises a first resistor and a second resistor arranged as a voltage divider, wherein the voltage divider receives the boost voltage as an input and provides a feedback voltage to the haptic controller as an output.

5. The electronic device of claim 4, wherein when the switch is activated by the actuator identification signal, the switch adds a third resistor to the feedback resistor network, the third resistor coupled to the voltage divider in parallel with the second resistor.

6. A method comprising:
   receiving an actuator identification signal from an actuator in an electronic device, the actuator identification signal to identify the actuator as a first actuator type and to indicate an operational characteristic of the actuator;

control circuit based on the actuator identification signal, controlling, by a voltage control circuit, an effective resistance of a feedback resistor network based on the actuator identification signal to determine a first operating voltage for the actuator, the feedback resistor network configured to adjust a boost voltage received as an input to the first operating voltage, wherein the first operating voltage corresponds to the first actuator type and wherein a second operating voltage corresponds to a second actuator type; and
   providing a drive signal at the first operating voltage to the actuator.

7. The method of claim 6, wherein receiving the actuator identification signal comprises receiving a floating signal when the actuator comprises the first actuator type, the method further comprising:
   pulling the floating signal to a haptic pull-up voltage using a pull-up resistor.

8. The method of claim 6, wherein receiving the actuator identification signal comprises receiving a ground signal when the actuator comprises the second actuator type.

9. The method of claim 6, wherein receiving the actuator identification signal comprises receiving the actuator identification signal over a serial interface, the actuator identification signal comprising a specific voltage and waveform for controlling the actuator.

10. The method of claim 6, wherein the feedback resistor network comprises a first resistor and a second resistor arranged as a voltage divider, wherein the voltage divider receives the boost voltage as the input and provides a feedback voltage as an output.

11. The method of claim 10, wherein controlling the effective resistance comprises activating a switch to add a third resistor to the feedback resistor network when the actuator identification signal identifies the actuator as the first actuator type, wherein the third resistor is coupled to the voltage divider in parallel with the second resistor.

12. The method of claim 10, wherein providing the drive signal at the operating voltage to the actuator comprises setting the operating voltage based on the feedback voltage received from the feedback resistor network.

13. The method of claim 6, further comprising:
   determining, by the voltage control circuit based on the actuator identification signal, a waveform for the actuator; and
   providing the drive signal having the determined waveform to the actuator.

14. An electronic device comprising:
   an actuator to provide an actuator identification signal, the actuator identification signal to identify the actuator as a first actuator type and to indicate an operational characteristic of the actuator;
   an application processing device coupled to the actuator, the application processing device configured to receive the actuator identification signal from the actuator;
   a voltage control circuit coupled to the application processing device, the voltage control circuit comprising a feedback resistor network controlled by the application processing device, wherein the application processing device is configured to change an effective resistance of the feedback resistor network based on the actuator identification signal, wherein a first effective resistance corresponds to the first actuator type and a second effective resistance corresponds to a second actuator type; and
   a haptic controller coupled to the actuator, the application processing device and the voltage control circuit, the haptic controller configured to provide an actuator drive signal to the actuator based on the first effective resistance of the feedback resistor network in the voltage control circuit.

15. The electronic device of claim 14, wherein the actuator comprises a three pin connector, wherein a first pin and a second pin of the three pin connector comprise actuator outputs and a third pin of the three pin connector provides the actuator identification signal, and wherein the third pin is floating when the actuator comprises the first actuator type and is tied to a ground when the actuator comprises the second actuator type.

16. The electronic device of claim 14, wherein the actuator comprises a four pin connector, wherein a first pin and a second pin of the four pin connector comprise actuator outputs, a third pin of the three pin connector provides the actuator identification signal, and a fourth pin of the four pin connector is grounded, and wherein the third pin is floating when the actuator comprises the first actuator type and is tied to the fourth pin when the actuator comprises the second actuator type.

17. The electronic device of claim 14, wherein to change the effective resistance of the feedback resistor network based on the actuator identification signal, the application processor configured to activate a subset of resistors in the feedback resistor network to set the effective resistance to a value to cause an output of the feedback resistor network to produce an operating voltage of the actuator.

18. The electronic device of claim 14, wherein the actuator drive signal provided by the haptic controller comprises the operating voltage of the actuator.

19. An electronic device comprising:
an actuator to provide an actuator identification signal, the actuator identification signal to identify the actuator as a first actuator type and to indicate an operational characteristic of the actuator;
a voltage control circuit coupled to the actuator, the voltage control circuit comprising a feedback resistor network controlled by the actuator identification signal, wherein the voltage control circuit is configured to change an effective resistance of the feedback resistor network based on the actuator identification signal, wherein a first effective resistance corresponds to the first actuator type and a second effective resistance corresponds to a second actuator type; and
a haptic controller coupled to the actuator and the voltage control circuit, the haptic controller configured to provide an actuator drive signal to the actuator based on the effective resistance of the feedback resistor network in the voltage control circuit.

20. The electronic device of claim 19, wherein the feedback resistor network comprises a first resistor and a second resistor arranged as a voltage divider, wherein the voltage divider receives a boost voltage from the haptic controller as an input and provides a feedback voltage to the haptic controller as an output.

21. The electronic device of claim 20, wherein to change the effective resistance of the feedback resistor network, the voltage control circuit is configured to add a third resistor to the feedback resistor network, the third resistor coupled to the voltage divider in parallel with the second resistor.

* * * * *